(12) United States Patent
Cheng et al.

(10) Patent No.: US 10,540,095 B1
(45) Date of Patent: Jan. 21, 2020

(54) EFFICIENT GARBAGE COLLECTION FOR STABLE DATA

(71) Applicant: PURE STORAGE, INC., Mountain View, CA (US)

(72) Inventors: Huihui Cheng, Fremont, CA (US); Gunjan Dang, Sunnyvale, CA (US); Michael Goldsby, San Francisco, CA (US); Yanwei Jiang, Sunnyvale, CA (US); Aswin Karumbunathan, San Francisco, CA (US); Pete Kirkpatrick, Mountain View, CA (US); Naveen Neelakantam, Mountain View, CA (US); Neil Buda Vachharajani, San Francisco, CA (US); Junming Zhu, Mountain View, CA (US)

(73) Assignee: PURE STORAGE, INC., Mountain View, CA (US)

( * ) Notice: Subject to any disclaimer, the term of this patent is extended or adjusted under 35 U.S.C. 154(b) by 336 days.

(21) Appl. No.: 15/416,385

(22) Filed: Jan. 26, 2017

Related U.S. Application Data

(60) Provisional application No. 62/374,460, filed on Aug. 12, 2016.

(51) Int. Cl.
*G06F 3/06* (2006.01)
*G06F 12/02* (2006.01)
(Continued)

(52) U.S. Cl.
CPC ............ *G06F 3/061* (2013.01); *G06F 3/0665* (2013.01); *G06F 3/0685* (2013.01);
(Continued)

(58) Field of Classification Search
CPC ...... G06F 3/061; G06F 3/0665; G06F 3/0685; G06F 16/14; G06F 16/16; G06F 16/13; G06F 12/0261
(Continued)

(56) References Cited

U.S. PATENT DOCUMENTS 6,286,056 B1   9/2001   Edgar et al.
6,804,703 B1   10/2004  Allen et al.
(Continued)

OTHER PUBLICATIONS

Greenwald, M. et al. (May 2001). "Space-Efficient Online Computation of Quantile Summaries", ACM SIGMOD, pp. 58-66.
(Continued)

*Primary Examiner* — Hares Jami
(74) *Attorney, Agent, or Firm* — Womble Bond Dickinson (US) LLP; Daniel E. Ovanezian

(57) ABSTRACT

A storage controller coupled to a storage array comprising one or more storage devices performs a uniform sampling of data storage items in an append-only file system to identify a sample set and identifies at least two data storage item groups based on an age of the data storage items. The storage controller performs a garbage collection process on the append-only file system to identify stale data storage items in a first logical storage segment and active data storage items in the first logical storage segment and writes a first active data storage item associated with a first group of the two data storage item groups from the first logical storage segment to a second logical storage segment, the second logic storage segment comprising other active data storage items associated with the first group.

7 Claims, 6 Drawing Sheets

(51) Int. Cl.
*G06F 16/13* (2019.01)
*G06F 16/14* (2019.01)
*G06F 16/16* (2019.01)

(52) U.S. Cl.
CPC .......... *G06F 12/0261* (2013.01); *G06F 16/13* (2019.01); *G06F 16/14* (2019.01); *G06F 16/16* (2019.01)

(58) Field of Classification Search
USPC .................................................. 707/813, 814
See application file for complete search history.

(56) References Cited

U.S. PATENT DOCUMENTS

| | | | |
|---|---|---|---|
| 6,954,881 | B1 | 10/2005 | Flynn Jr. et al. |
| 7,139,907 | B2 | 11/2006 | Bakke et al. |
| 7,272,674 | B1 | 9/2007 | Nandi et al. |
| 7,313,636 | B2 | 12/2007 | Qi |
| 7,577,802 | B1 | 8/2009 | Parsons |
| 8,103,754 | B1 | 1/2012 | Luong et al. |
| 8,301,811 | B1 | 10/2012 | Wigmore et al. |
| 8,645,649 | B2 | 2/2014 | Kaiya et al. |
| 9,063,937 | B2 | 6/2015 | McDowell et al. |
| 9,294,567 | B2 | 3/2016 | Hussain et al. |
| 9,430,412 | B2 | 8/2016 | Huang |
| 9,501,245 | B2 | 11/2016 | Hussain et al. |
| 9,565,269 | B2 | 2/2017 | Malwankar et al. |
| 2001/0017076 | A1* | 8/2001 | Fujita ....................... G10H 7/02 84/603 |
| 2007/0180001 | A1* | 8/2007 | Akelbein .............. G06F 16/119 |
| 2008/0034167 | A1 | 2/2008 | Sharma et al. |
| 2008/0059540 | A1* | 3/2008 | Brown .................. G06F 16/283 |
| 2009/0292662 | A1* | 11/2009 | Ueno ....................... G06F 17/18 706/46 |
| 2012/0166749 | A1* | 6/2012 | Eleftheriou ........... G06F 3/0616 711/165 |
| 2015/0019798 | A1 | 1/2015 | Huang |
| 2016/0335318 | A1* | 11/2016 | Gerweck ............. G06F 16/2282 |
| 2017/0024166 | A1 | 1/2017 | Singh et al. |

OTHER PUBLICATIONS

Buragohain, C. et al. (2009). "Quantiles on Streams". Encyclopedia of Database Systems—Springer. pp. 1-5.

"Reservoir Sampling" (Dec. 14, 2016). downloaded from https://en.wilipedia.org/wiki/Reservoir_sampling, 7 pages.

Ouyang, J. et al. (Mar. 1-5, 2014) "SDF: Software-Defined Flash for Web-Scale Internet Storage Systems", ASPLOS 2014, 14 pages.

Zhang, J. et al. (2016) "Application-Aware and Software-Defined SSD Scheme for Tencent Large-Scale Storage System" 2016 IEEE 22nd International Conference on Parallel and Distributed Systems, 482-490.

"Open-Channel Solid State Drives NVMe Specification" (Apr. 2016), 24 pages.

* cited by examiner

EFFICIENT GARBAGE COLLECTION FOR STABLE DATA

RELATED APPLICATIONS

This application claims priority to U.S. Provisional Application No. 62/374,460, filed Aug. 12, 2016, the entire contents of which are hereby incorporated by reference herein.

BACKGROUND

As computer memory storage and data bandwidth increase, so does the amount and complexity of data that businesses manage daily. Large-scale distributed storage systems, such as data centers, typically run many business operations. A datacenter, which also may be referred to as a server room, is a centralized repository, either physical or virtual, for the storage, management, and dissemination of data pertaining to one or more businesses. A distributed storage system may be coupled to client computers interconnected by one or more networks. If any portion of the distributed storage system has poor performance, company operations may be impaired. A distributed storage system therefore maintains high standards for data availability and high-performance functionality.

BRIEF DESCRIPTION OF THE DRAWINGS

The present disclosure is illustrated by way of example, and not by way of limitation, in the figures of the accompanying drawings.

DETAILED DESCRIPTION

Figure 1:
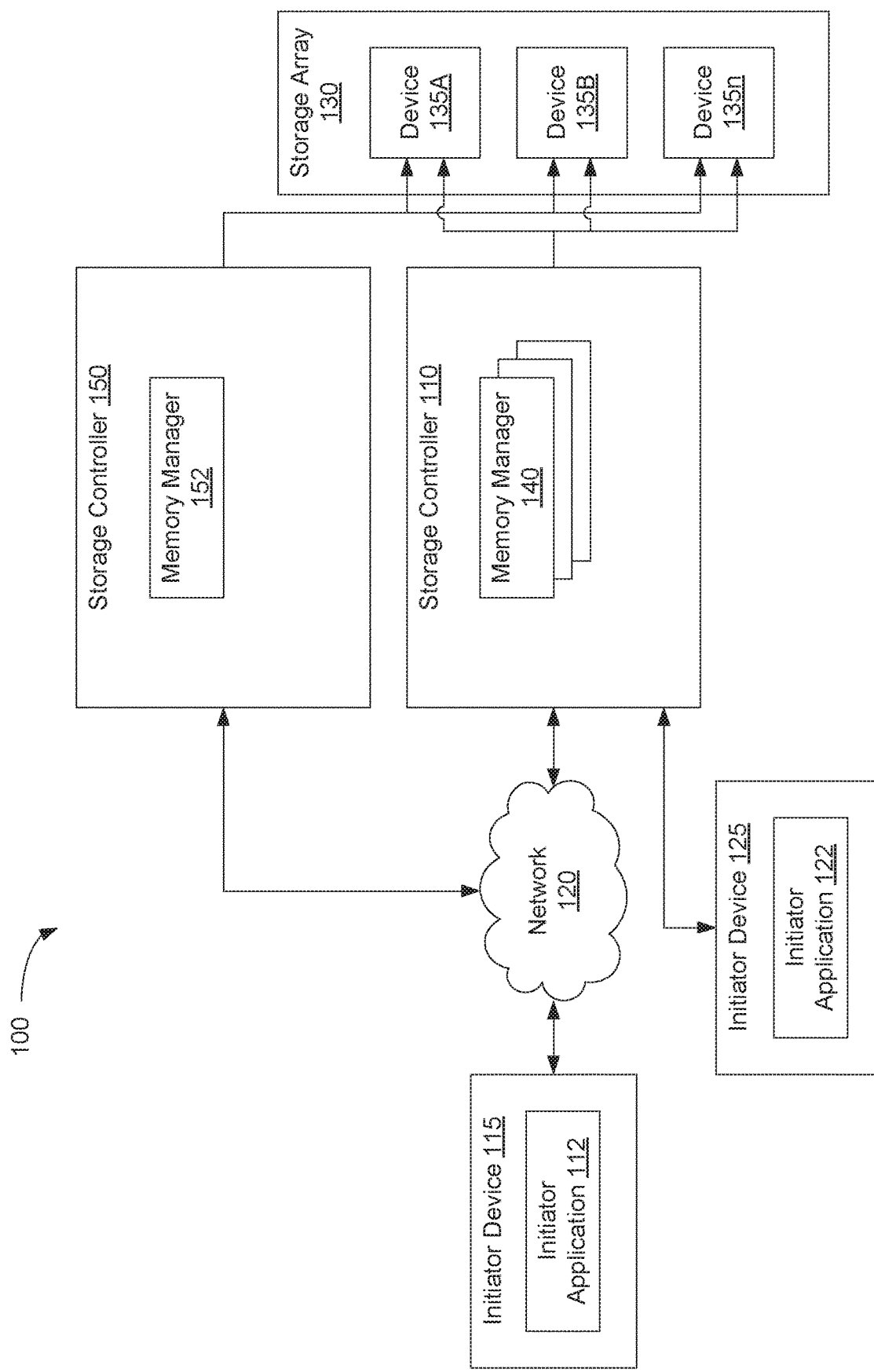
FIG. 1 is a block diagram illustrating a storage system in which embodiments of the present disclosure may be implemented.

Embodiments are described for uniform sampling of an append-only database to determine temporal distribution of data. In an append-only system that does not permit in-place overwrites, there is no easy way to detect when a data value has been changed. In the append-only system, rather than overwriting an existing data value, a new data value may instead be written to a different storage location and corresponding pointers are updated to reference the new storage location. The old data value may remain in place, but is considered stale and no longer used. In such a system, it can be hard to determine the temporal distribution of the data (i.e., how old different data elements are). Knowing the temporal distribution of the data can be advantageous, as it allows a storage controller to make decisions about the stability of data with timestamps or sequence numbers (which indicate the age of the data) in different ranges. The stability reflects how long the data has lasted without being overwritten, with the assumption that data which has not been overwritten for a long period of time is unlikely to be overwritten in the future. This knowledge may be used to apply deeper compression or other data reduction techniques to more stable data and to improve the efficiencies of other processes, such as garbage collection.

In one embodiment, a memory manager performs a uniform sampling over the timestamps or sequence numbers of all the storage location metadata for an append only database. The sample represents a distribution of the age of all data in the system. This distribution can then be used to cluster data with similar temporal locality. By walking through the metadata periodically, updated views of the distribution of data age over time can be obtained. In one embodiment, the sampling is performed as a periodic background process to get continually updated samples. The memory manager may further keep a history of samples collected over time to confirm that the data in each cluster has a similar overwrite rate. Since the system already track timestamps (or sequence numbers) for each write operation to the array, a simple software upgrade can be made to introduce the sampling to an array that is not already configured to do so.

By grouping data with similar temporal locality, various other processes can be performed more efficiently. For example, garbage collection and compression can be improved as a result. Garbage collection is a form of automatic memory management that attempts to reclaim garbage, or memory occupied by stale data objects that are no longer in use (e.g., because they have been updated with new values in the append-only system). The basic principle of garbage collection is to find data objects in a system that cannot or need not be accessed in the future, and to reclaim the resources (i.e. storage space) used by those objects. When garbage data that needs to be collected is distributed throughout the storage array, it slows down the collection process utilizing unnecessary time and resources. Thus, it would be advantageous to locate garbage data together in the same storage unit (i.e., segment) to increase efficiencies.

Temporal locality is one indication of the likelihood that data items will become garbage and need to be collected. Older data (i.e., data with timestamps further from the current time) that has not been accessed lately (i.e., has not had a write operation performed on it or otherwise been written to) is not likely to be needed again or overwritten in the future. As a result it will not likely become garbage or need garbage collection. Thus, older data items (i.e., cold data) can be grouped together. Newer data that has been written or accessed recently (i.e., hot data) is more likely to be relevant and accessed again in the future, and has a higher likelihood of being overwritten and becoming garbage. Thus, these newer data items can be grouped together in the array so that if garbage collection is needed, it can be performed more efficiently. It can be more efficient to collect more garbage in fewer segments than a little bit of garbage spread across different segments in the array. In another embodiment, the memory manager can sample read timestamps and collocate data based on read locality, instead of or in addition to write locality. Collocating based on read locality may be used in a hybrid array where data that is truly never accessed (i.e., neither read nor written) is moved to a stable and cheap storage medium.

In one embodiment, the memory manager performs reservoir sampling over the timestamps of all the storage location metadata for the append only database, to get a uniform random sample set of the data. Each sample set provides an updated snapshot of current data age distribution. This distribution provides a guidance of the data temporal locality and the information can be used to guide other application decisions. Temporal locality refers to the proximity of two different data updates in terms of time or age. Using reservoir sampling to build the sample ensures that each piece of data has equal probability of being included in the sample.

To identify age clusters from the sample, the memory manager may use a distribution density function to locate possible age clusters as density peaks (where the troughs identify cluster boundaries). Further, since each sample has a small memory footprint, the memory manager can keep a time history of samples to confirm certain peak areas are more likely to remain intact as a cluster in the future, or in some cases, be overwritten together. With this information the memory manager can bin these clustered data items together during data defragmentation or garbage collection, which can highly improve efficiency of future defragmentation or garbage collection processes.

Reservoir sampling is inherently noisy, so the memory manager may employ certain optimizations to bound error. For example, temporal cluster boundaries may only be allowed to monotonically increase after each sample, which implicitly clips error that falls below previous samples.

Using this sampling method can save processor cycles and storage space during garbage collection in an append-only storage system. After extrapolating bins of rate of change from multiple samples, the memory manager can then group live data into new and old data clusters. New means it is recently created or overwritten, while old means the data was written in the distant past. Old data is also unlikely to change in the future. In one embodiment, the system can apply deep compression to this old and stable data and save storage space. Alternatively, new data can change in the near future. By avoiding apply deep compression, the system can save processing resources when accessing this data.

Similarly, data with similar temporal locality may also be logically overwritten at similar times (thereby becoming dead at similar times). By co-locating live data with similar temporal locality, garbage collection becomes more efficient because when the data dies and is later garbage collected it is more likely that co-located data is also dead. In this approach, the memory manager is actually sampling the data that is on the array, and uses that data to make a decision about where to draw a line between new or old data.

FIG. 1 is a block diagram illustrating a storage system 100 in which embodiments of the present disclosure may be implemented. Storage system 100 may include storage controllers 110, 150 and storage array 130, which is representative of any number of data storage arrays or storage device groups. As shown, storage array 130 includes storage devices 135A-n, which are representative of any number and type of storage devices (e.g., solid-state drives (SSDs)). Storage controller 110 may be coupled directly to initiator device 125 and storage controller 110 may be coupled remotely over network 120 to initiator device 115. In one embodiment, storage controller 150 is coupled remotely over network 120 to initiator device 115. Initiator devices 115 and 125 are representative of any number of clients which may utilize storage controllers 110 and 150 for storing and accessing data in storage system 100. It is noted that some systems may include only a single client or initiator device, connected directly or remotely, to storage controllers 110 and 150.

In one embodiment, controller 110 is designated as the "primary" controller, which performs most or all of the I/O operations on the array 130. If, however, a software crash, hardware fault or other error occurs, the "secondary" controller 150 may be promoted to serve as the primary controller and take over all responsibilities for servicing the array 130. In one embodiment, storage controllers 110 and 150 are identical and any description of controller 110 herein may be equally attributed to storage controller 150.

Storage controller 110 may include software and/or hardware configured to provide access to storage devices 135A-n. Although storage controller 110 is shown as being separate from storage array 130, in some embodiments, storage controller 110 may be located within storage array 130. Storage controller 110 may include or be coupled to a base operating system (OS), a volume manager, and additional control logic, such as memory manager 140, for implementing the various techniques disclosed herein. In one embodiment, the OS is designed with flash storage in mind, so while it can use conventional SSDs to store data, it does not depend on a 512 byte random overwrite capability. Even on conventional SSDs, storage controller 110 can achieve better performance by writing and discarding data in large chunks. This style of I/O is sometimes called "flash friendly I/O." This also makes it a much easier task to convert the OS to use the physical addressing of storage devices, as compared to conventional filesystems.

In one embodiment, the logic of memory manager 140 is contained within an object which manages one of devices 135A-n. Thus, there may be a separate memory manager object for each device 135A-n in storage array 130. As new devices are connected to controller 110, new memory manager objects may be created. These objects may be similarly discarded when a corresponding device is disconnected from storage controller 110. Clients wishing to communicate with memory manager 140, such as one of initiator applications 112, 122, the operating system running on storage controller 110 or another client application running on storage controller 110, may do so via a memory manager application programming interface (API) published by memory manager 140. In one embodiment, multiple clients can access the same memory manager object concurrently. In one embodiment, storage controller 150 includes a separate instance(s) of memory manager 152.

Storage controller 110 may include and/or execute on any number of processing devices and may include and/or execute on a single host computing device or be spread across multiple host computing devices, depending on the embodiment. In some embodiments, storage controller 110 may generally include or execute on one or more file servers and/or block servers. Storage controller 110 may use any of various techniques for replicating data across devices 135A-n to prevent loss of data due to the failure of a device or the failure of storage locations within a device. Storage controller 110 may also utilize any of various deduplication techniques for reducing the amount of data stored in devices 135A-n by deduplicating common data.

In one embodiment, storage controller 110 may utilize logical volumes and mediums to track client data that is stored in storage array 130. A medium is defined as a logical grouping of data, and each medium has an identifier with which to identify the logical grouping of data. A volume is a single accessible storage area with a single file system, typically, though not necessarily, resident on a single partition of a storage device. The volumes may be logical organizations of data physically located on one or more of storage device 135A-n in storage array 130. Storage controller 110 may maintain a volume to medium mapping table to map each volume to a single medium, and this medium is referred to as the volume's anchor medium. A given request received by storage controller 110 may indicate at least a volume and block address or file name, and storage controller 110 may determine an anchor medium targeted by the given request from the volume to medium mapping table.

In one embodiment, storage controller 110 includes memory manager 140. In one embodiment, memory manager 140 implements an append-only database or filesystem on storage array 130 that does not permit in-place overwrites. In such a system, there is no easy way to detect when a data value has been changed because rather than overwriting an existing data value, a new data value may instead be written to a different storage location and corresponding pointers are updated to reference the new storage location, while the old data value remains in place, but is considered stale and no longer used.

In one embodiment, the system metadata includes timestamps or sequence numbers indicating when a corresponding data item was written to storage array 130. In one embodiment, an actual timestamp is not required and a sequence number that monotonically increases with the number of writes entering the system may be used. Memory manager 140 may use this data to identify data of similar age and redistribute that data to collocate data items of similar age within storage array 130.

In one embodiment, in order to avoid having to walk through all of the data in storage array 130, memory manager 140 can perform a uniform random sample (e.g., using reservoir sampling) across all of the metadata to build a smaller sample that easily fits in memory. From this data, percentiles can be determined such as the $50^{th}$ or $80^{th}$ percentile, for example. This represents the time value where 50% of the data is older than the value and 50% is newer, or 80% and 20%, as appropriate. The system can use one of these percentiles as a threshold between hot and cold data. This uses the data that is actually on the array 130 presently, rather than all the writes that have ever happened, which could give misleading results. For example, if multiple over-writes of the same sector are performed, those will no longer be counted multiple times, as they were in previous systems, thereby skewing the results.

After distinguishing between old and new data, memory manager 140 can reorganize the data in logical segments in the array to put all old data together in the same segment. Since the system is less likely to have to make changes to the old data, it is therefore less likely to have to garbage collect those segments. Additional details of memory manager 140 are provided below with respect to FIGS. 2-5.

In various embodiments, multiple mapping tables may be maintained by storage controller 110. These mapping tables may include a medium mapping table and a volume to medium mapping table. These tables may be utilized to record and maintain the mappings between mediums and underlying mediums and the mappings between volumes and mediums. Storage controller 110 may also include an address translation table with a plurality of entries, wherein each entry holds a virtual-to-physical mapping for a corresponding data component. This mapping table may be used to map logical read/write requests from each of the initiator devices 115 and 125 to physical locations in storage devices 135A-n. A "physical" pointer value may be read from the mappings associated with a given medium during a lookup operation corresponding to a received read/write request. The term "mappings" is defined as the one or more entries of the address translation mapping table which convert a given medium ID and block number into a physical pointer value. This physical pointer value may then be used to locate a physical location within the storage devices 135A-n. The physical pointer value may be used to access another mapping table within a given storage device of the storage devices 135A-n. Consequently, one or more levels of indirection may exist between the physical pointer value and a target storage location.

In alternative embodiments, the number and type of client computers, initiator devices, storage controllers, networks, storage arrays, and data storage devices is not limited to those shown in FIG. 1. At various times one or more clients may operate offline. In addition, during operation, individual client computer connection types may change as users connect, disconnect, and reconnect to storage system 100. Further, the systems and methods described herein may be applied to directly attached storage systems or network attached storage systems and may include a host operating system configured to perform one or more aspects of the described methods. Numerous such alternatives are possible and are contemplated.

Network 120 may utilize a variety of techniques including wireless connections, direct local area network (LAN) connections, wide area network (WAN) connections such as the Internet, a router, storage area network, Ethernet, and others. Network 120 may comprise one or more LANs that may also be wireless. Network 120 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, and so forth may be used in network 120. The network 120 may interface with a set of communications protocols used for the Internet such as the Transmission Control Protocol (TCP) and the Internet Protocol (IP), or TCP/IP. In one embodiment, network 120 represents a storage area network (SAN) which provides access to consolidated, block level data storage. The SAN may be used to enhance the storage devices accessible to initiator devices so that the devices 135A-n appear to the initiator devices 115 and 125 as locally attached storage.

Initiator devices 115 and 125 are representative of any number of stationary or mobile computers such as desktop personal computers (PCs), servers, server farms, workstations, laptops, handheld computers, servers, personal digital assistants (PDAs), smart phones, and so forth. Generally speaking, initiator devices 115 and 125 include one or more processing devices, each comprising one or more processor cores. Each processor core includes circuitry for executing instructions according to a predefined general-purpose instruction set. For example, the x86 instruction set architecture may be selected. Alternatively, the ARM®, Alpha®, PowerPC®, SPARC®, or any other general-purpose instruction set architecture may be selected. The processor cores may access cache memory subsystems for data and computer program instructions. The cache subsystems may be coupled to a memory hierarchy comprising random access memory (RAM) and a storage device.

In one embodiment, initiator device 115 includes initiator application 112 and initiator device 125 includes initiator application 122. Initiator applications 112 and 122 may be any computer application programs designed to utilize the data on devices 135A-n in storage array 130 to implement or provide various functionalities. Initiator applications 112 and 122 may issue requests to read or write data from certain logical volumes data within storage system 100. Those requests can be serviced by memory manager 140 of storage controller 110, as described in detail herein.

Figure 2:
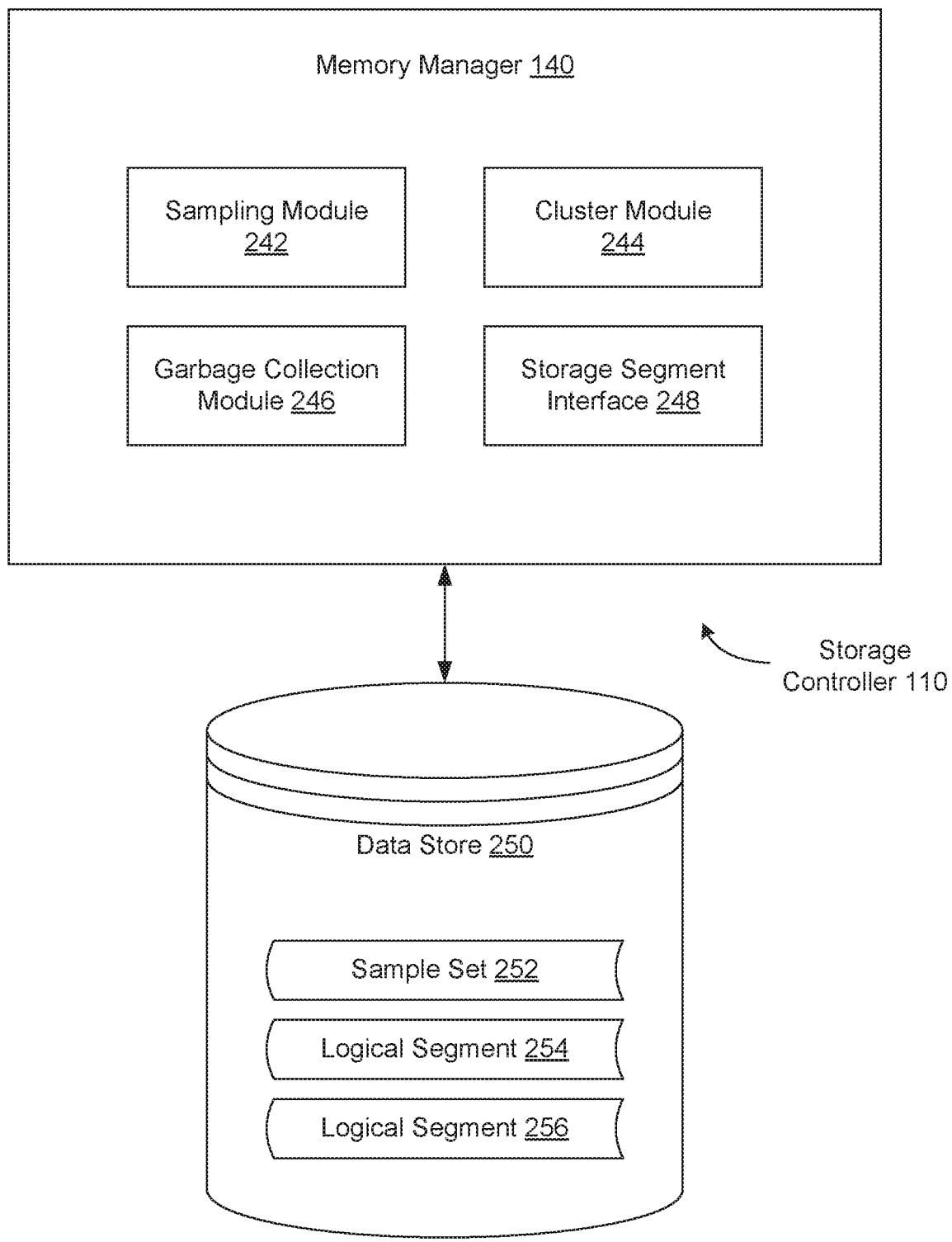
FIG. 2 is a block diagram illustrating a memory manager in a storage controller, according to an embodiment.

FIG. 2 is a block diagram illustrating memory manager 140 in a storage controller 110, according to an embodiment. In one embodiment, memory manager 140 includes sampling module 242, cluster module 244, garbage collection module 246 and storage segment interface 248. This arrangement of modules may be a logical separation, and in other embodiments, these modules, interfaces or other components can be combined together or separated into further components. In one embodiment, data store 250 is connected to memory manager 140 and includes sample set 252, logical segment data 254, 256. In one embodiment, storage controller 110 may include memory manager 140 and data store 250. In another embodiment, data store 250 may be external to storage controller 110 and may be connected to memory manager 140 over a network or other connection. In other embodiments, storage controller 110 may include different and/or additional components which are not shown to simplify the description. Data store 250 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

In one embodiment, sampling module 242 performs a uniform sampling of data storage items in an append-only file system to identify a sample set 252. As described above, there may be a large number of data storage items (e.g., data blocks) distributed across the storage devices 135A-n of storage array 130. To determine a data age distribution of every data storage item would be a time consuming and resource-intensive process and the results would be too large to use and store efficiently. Accordingly, sampling module 242 can perform a uniform sampling over the timestamps or sequence numbers of the storage location metadata for the data storage items. In one embodiment, sampling module 242 applies a reservoir sampling algorithm to the data storage items to identify a sample set 252. The sample set 252 is much smaller in size and comprises a subset of all the data storage items in the append-only file system, but still represents a distribution of the age of all data in the system. The reservoir sampling algorithm allows each of the data storage items in the append-only file system to have an equal probability of appearing in the sample set 252. Once identified, sampling module 242 may store the sample set 252 in data store 250. In one embodiment, sampling module 242 performs the sampling as a periodic background process to get continually updated samples. Sampling module 242 may further keep a history of samples collected over time, which may be compared to confirm that the data in each cluster has a similar overwrite rate.

In one embodiment, cluster module 244 identifies a plurality of clusters from the sample set. In one embodiment, the data storage items may be clustered by age. The age may be represented by a timestamp indicating when the data block was first created or most recently modified or overwritten, or a sequence number that monotonically increases with the number of writes entering the system. In one embodiment, cluster module 244 receives one or more percentile threshold values from a user of one of initiator devices 115, 125, from a system administrator, from a computer application program running on one of initiator devices 115, 125 or storage controllers 110, 150, or from some other source. For example, if the received percentile threshold value is 50, two groups or clusters can be created: a first group where 50% of the data in the sample set 252 is older than the value, and a second group where 50% of the data in newer than the value. Similarly, if the received percentile threshold value is 80, cluster module 244 can create a first group where 80% of the data is older than the value and a second group where 20% of the data is newer than the value. Cluster module 244 may also receive additional percentile threshold values, which can be used to create additional groups or clusters. For example, two thresholds can divide the data into three groups, three thresholds can divide the data into four groups, etc.

In another embodiment, cluster module 244 applies a distribution density function to sample set 252. For example, cluster module 244 may plot the number of data storage items determined to have particular data age values against those data age values. In one embodiment, the distribution density function may be one form of a kernel density estimation used to estimate the probability density function of a random variable. The function uses a smoothing parameter to give a continuous curve 301 over the relevant range of data ages, as illustrate in FIG. 3A. Cluster module 244 can identify troughs or valleys present in the curve 301 which are represented by the minimum density range. Cluster module 244 can utilize the data ages corresponding to these troughs or valleys (e.g., 55, 70, 90 in FIG. 3A) as dividing thresholds for purposes of creating groups or clusters. Using curve 301 as an example, a first group could contain data storage items having a data age less than 55, a second group between 55 and 70, a third group between 70 and 90 and a fourth group greater than 90. The number of groups may be a defined parameter or may be based on what is provided in the data. Additionally, a particular group may span a minimum or maximum range of data age values or may contain a minimum or maximum number of data storage items.

In one embodiment, cluster module 244 may notify the user of one of initiator devices 115, 125, the system administrator, the computer application program running on one of initiator devices 115, 125 or storage controllers 110, 150, or some other entity of the location of the dividing thresholds and the corresponding data age value. These troughs or valleys may be indicative of an event that occurred at a particular point in time which caused a lesser amount of data storage items to be overwritten at that time. The user or administrator may wish to investigate the occurrence of this event to determine how it may affect operations of the storage system. In another embodiment, memory manager 140 or some other application may correlate the data age values corresponding to the troughs with event logs, system logs, or other data records in an attempt to automatically determine the cause of the event. In addition, peaks in curve 301 may be indicative of an event that caused a large amount of data to be overwritten and may be similarly investigated.

In other embodiments, cluster module 244 may group the data storage items based on other characteristics aside from data age. For example, cluster module 244 may use the amount of deduplication. In one embodiment, deduplication and snapshots (or snapshot-like metadata operations) can cause some physical blocks to have multiple references. Similar to age, this may have an effect on how certain data storage items will likely become stale. For example, data blocks with many references are likely to live longer than data blocks with only a single reference. In another embodiment, cluster module 244 may group the data storage items based on snapshots. Whether a particular data block is present in a snapshot or not could have an effect on when it will be garbage collected since snapshot schedules are a particular write pattern that the array can distinguish from other write patterns. In another embodiment, the clustering is based on physical sectors. Sampling module 242 can sample across the physical space rather than the logical space and come up with a distribution of age/compression/liveness across segments, rather than across a logical address space. In one embodiment, clustering is done per-volume where sampling module 242 samples across the logical space and apply some of these other metrics on a per-volume basis. For example, the age distributions of various volumes individually may make more sense than the overall age distribution, which contains information from all of these volumes mixed together.

In one embodiment, garbage collection module 246 performs a garbage collection process on the append-only file system to identify stale data storage items in a first logical storage segment and active data storage items in the first logical storage segment. Garbage collection is a form of automatic memory management that attempts to reclaim garbage, or memory occupied by stale data objects that are no longer in use (e.g., because they have been updated with new values in the append-only system). The basic principle of garbage collection is to find data objects in a system that cannot or need not be accessed in the future, and to reclaim the resources (i.e. storage space) used by those objects. Stale data storage items (i.e., garbage) may be specifically marked as such with an indication in metadata or may be identified by the lack of any pointers pointing to them (i.e., reference counting). Tracing techniques may be used to determine objects that are not reachable by a chain of references from certain root objects. Using one of these techniques, garbage collection module 246 can determine whether each data storage item is garbage (i.e., stale or not active) and can be deleted, or whether they are active and/or in-use and should be saved.

Figure 3A:
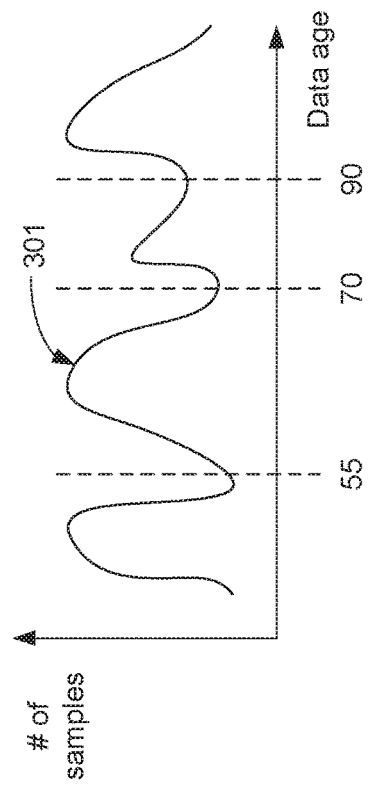
FIG. 3A is a diagram illustrating a plot of the age of data storage items resulting from a uniform sampling, according to an embodiment.
Figure 3B:
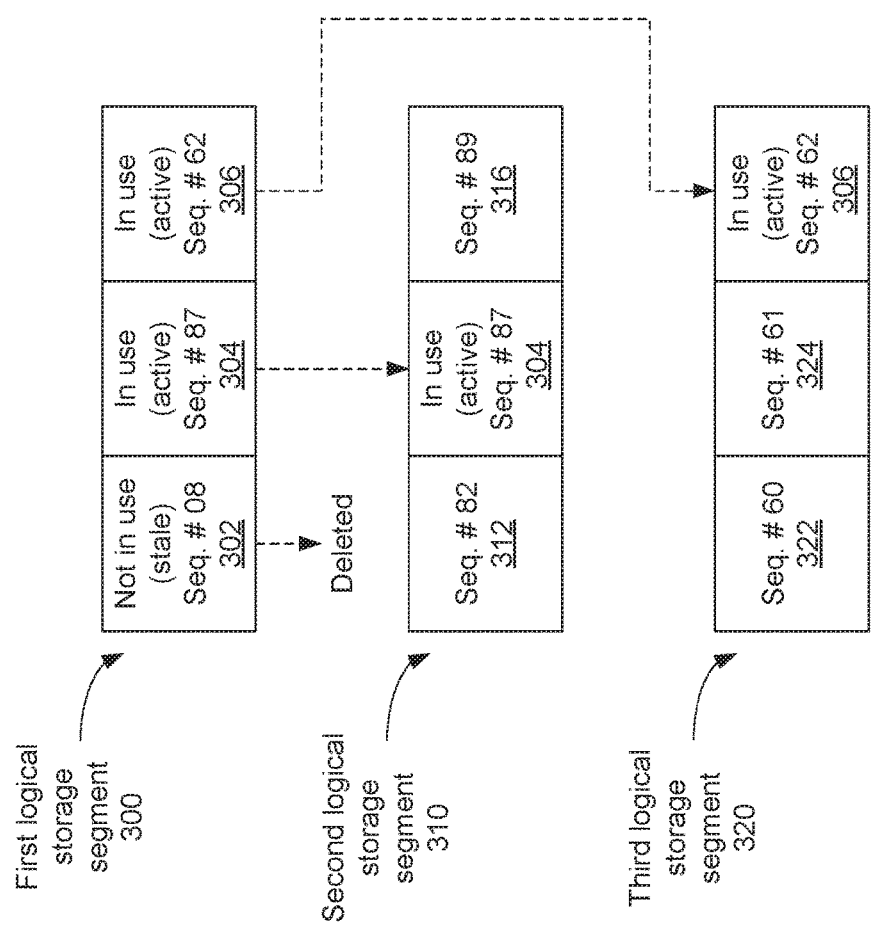
FIG. 3B is a block diagram illustrating the redistribution of data storage items according to age, according to an embodiment.

When garbage data that needs to be collected is distributed throughout the storage array, it slows down the collection process utilizing unnecessary time and resources. Thus, it would be advantageous to locate garbage data together in the same storage unit (i.e., segment) to increase efficiencies. In one embodiment, storage segment interface 248 moves the data storage items that are not identified as garbage to new logical storage segments 254, 256 based on the group or cluster to which the items are assigned by cluster module 244. FIG. 3B illustrates one embodiment of the process of redistributing data storage items according to age. In one embodiment, a first logical storage segment 300 includes three data storage items. A logical storage segment may include data blocks from a single storage device or may span multiple storage devices in storage array 130. Garbage collection module 246 may determine that block 302 is not in use (i.e., stale) and that blocks 304 and 306 remain in use (i.e., active). Since block 302 is not in use, storage segment interface 248 may delete the contents of block 302 and reallocate the storage space for some other use. Storage segment interface 248 may write (e.g., copy or move) the contents of blocks 304 and 306 to other logical storage segments based on the corresponding ages of the data.

In one embodiment, storage segment interface 248 writes the blocks based on the group or cluster to which they are assigned by cluster module 244. Using the cluster boundaries defined above with respect to FIG. 3A, block 304 (having sequence number 87) would be part of the group with data ages between 70 and 90 (i.e., group 3) and block 306 (having sequence number 62) would be part of the group with data ages between 55 and 70 (i.e., group 2). In one embodiment, storage segment interface 248 writes block 304 to a second logical storage segment 310 which contains other data storage items from group 3, including block 312 (having sequence number 82) and block 316 (having sequence number 89). In one embodiment, storage segment interface 248 writes block 306 to a third logical storage segment 320 which contains other data storage items from group 2, including block 322 (having sequence number 60) and block 324 (having sequence number 61). As a result, each of logical storage segments 310 and 320 include data storage items from a respective group or cluster. Since these data storage items are more likely to be overwritten and become garbage at the same or a similar time, garbage collection module 246 can perform the garbage collection process more efficiently on segments 310 and 320 in the future.

In one embodiment, the temporal colocation of data items can benefit other processes besides garbage collection, such as the fusing of cblocks. In the case where user writes or internal array activities fragment cblocks (and therefore also mappings, since mappings point to a continuous range in a cblock), a background process can run that combines cblocks to reduce this fragmentation. This process can be guided by information from sampled metrics telling us what ages, volumes, segments, etc. need to be defragmented.

In one embodiment, the structure of storage controller 110 allows a first data storage item from a first logical storage segment to the second logical storage segment and a second data storage item from the first logical storage segment to a third logical storage segment in parallel. Since storage controller 110 includes a separate instance of memory manager 140 for each of devices 135A-n in storage array 130, when the first logical storage segment and the second logical storage segment are resident on different storage devices, data storage items can be written to those segments in parallel. This increases the throughput of the system and reduces any latencies associated with the temporal redistribution process.

Figure 4:
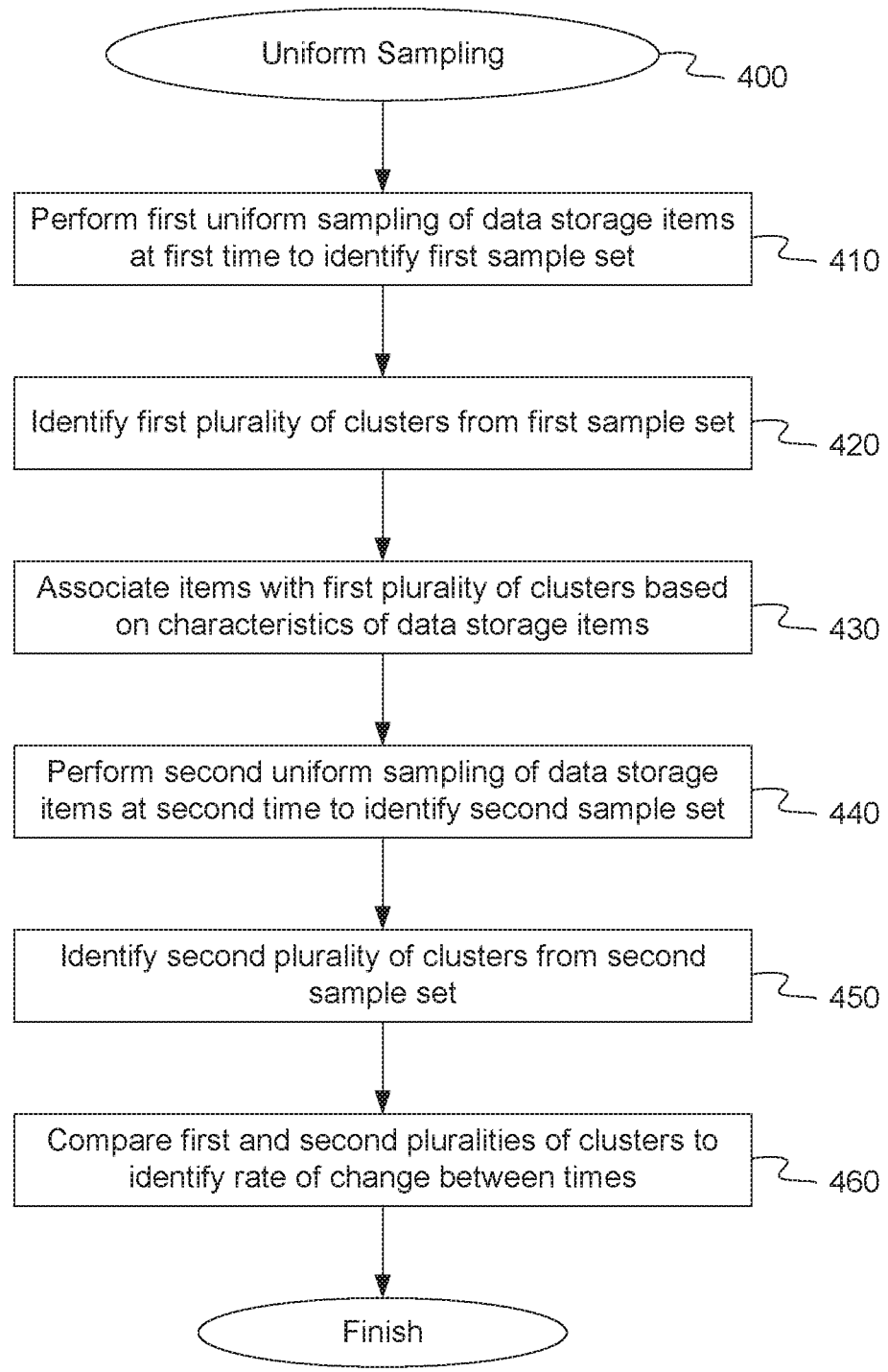
FIG. 4 is a flow diagram illustrating a method for uniform sampling in an append only database, according to an embodiment.

FIG. 4 is a flow diagram illustrating a method for uniform sampling in an append only database, according to an embodiment. The method 400 may be performed by processing logic that comprises hardware (e.g., circuitry, dedicated logic, programmable logic, microcode, etc.), software (e.g., instructions run on a processing device to perform hardware simulation), firmware, or a combination thereof. The method 400 can allow a storage controller to perform a uniform sampling over the timestamps or sequence numbers of all the storage location metadata for an append only database to generate a reasonably sized sample which can be stored in memory and represents a distribution of the age of all data storage items in the system. In one embodiment, method 400 may be performed by memory manager 140, as shown in FIGS. 1 and 2.

Referring to FIG. 4, at block 410, method 400 performs a first uniform sampling of data storage items in an append only file system at a first time to identify a first sample set. In one embodiment, sampling module 242 performs a uniform sampling over the timestamps or sequence numbers of the storage location metadata for the data storage items. In one embodiment, sampling module 242 applies a reservoir sampling algorithm to the data storage items to identify a sample set 252. The sample set 252 is much smaller in size and comprises a subset of all the data storage items in the append-only file system, but still represents a distribution of the age of all data in the system. The reservoir sampling algorithm allows each of the data storage items in the append-only file system to have an equal probability of appearing in the sample set 252.

At block 420, method 400 identifies a first plurality of clusters from the first sample set. In one embodiment, cluster module 244 groups the data storage items by age, which may be represented by a timestamp indicating when the data block was first created or most recently modified or overwritten, or a sequence number that monotonically increases with the number of writes entering the system. In one embodiment, cluster module 244 receives one or more percentile threshold values and uses those thresholds as cluster boundaries. In another embodiment, cluster module 244 applies a distribution density function to sample set 252 to identify the groups or clusters. In other embodiments, cluster module 244 may group the data storage items based on other characteristics aside from data age.

At block 430, method 400 associates the data storage items in the append-only file system with the first plurality of clusters based on characteristics of the data storage items. In one embodiment, storage segment interface 248 writes the blocks to logical storage segments which contain other data storage items from the same group 3 or cluster. As a result, each of the data storage items is stored in a logical storage segment with other data storage items from a respective group or cluster.

At block 440, method 400 performs a second uniform sampling of the data storage items in the append-only file system at a second time to identify a second sample set. The process may be similar to that described at block 410. Since the sampling occurs at a different time, however, the second sample set may have some differences from the first sample set as data input/output (I/O) operations may have altered the makeup of underlying file system.

At block 450, method 400 identifies a second plurality of clusters from the second sample set. The process may be similar to that described at block 420.

At block 460, method 400 compares the first plurality of data age clusters to the second plurality of data age clusters to identify a rate of change between the first time and the second time. In one embodiment, cluster module 244 compares the number of samples in a given cluster between the first and second times or compares the data age values of the cluster boundaries between the first and second times to determine the rate of change. If a particular trend is noticeable in the rate of change (e.g., a consistent level, a linear increase or decrease), cluster module 244 can extrapolate that rate of change to make predictions for the future.

Figure 5:
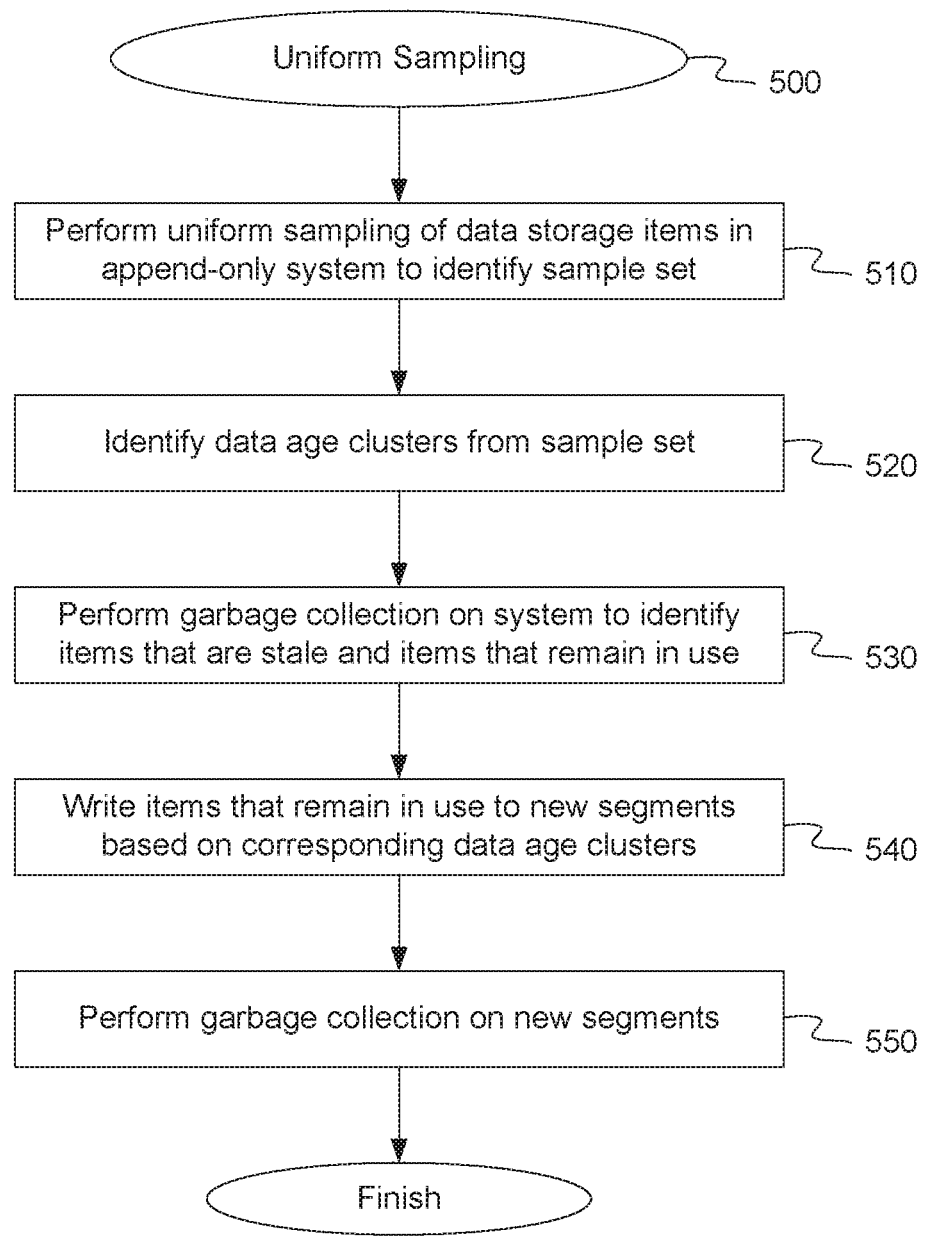
FIG. 5 is a flow diagram illustrating a method for uniform sampling to improve garbage collection, according to an embodiment.

FIG. 5 is a flow diagram illustrating a method for uniform sampling to improve garbage collection, according to an embodiment. The method 500 may be performed by processing logic that comprises hardware (e.g., circuitry, dedicated logic, programmable logic, microcode, etc.), software (e.g., instructions run on a processing device to perform hardware simulation), firmware, or a combination thereof. The method 500 can allow a storage controller to generate and use a sample set to group data storage items with those of similar temporal locality, in order to perform garbage collection and other processes more efficiently. In one embodiment, method 500 may be performed by memory manager 140, as shown in FIGS. 1 and 2.

Referring to FIG. 5, at block 510, method 500 performs a uniform sampling of data storage items in an append-only file system distributed across the plurality of storage volumes to identify a sample set. In one embodiment, sampling module 242 performs a uniform sampling over the timestamps or sequence numbers of the storage location metadata for the data storage items. In one embodiment, sampling module 242 applies a reservoir sampling algorithm to the data storage items to identify a sample set 252. The sample set 252 is much smaller in size and comprises a subset of all the data storage items in the append-only file system, but still represents a distribution of the age of all data in the system. The reservoir sampling algorithm allows each of the data storage items in the append-only file system to have an equal probability of appearing in the sample set 252.

At block 520, method 500 identifies a plurality of data age clusters from the sample set. In one embodiment, cluster module 244 groups the data storage items by age, which may be represented by a timestamp indicating when the data block was first created or most recently modified or overwritten, or a sequence number that monotonically increases with the number of writes entering the system. In one embodiment, cluster module 244 receives one or more percentile threshold values and uses those thresholds as cluster boundaries. In another embodiment, cluster module 244 applies a distribution density function to sample set 252 to identify the groups or clusters.

At block 530, method 500 performs a garbage collection process on the append-only file system to identify stale data storage items in a first logical storage segment and active data storage items in the first logical storage segment. In one embodiment, garbage collection module 246 performs a garbage collection process to reclaim garbage, or memory occupied by stale data objects that are no longer in use (e.g., because they have been updated with new values in the append-only system). The basic principle of garbage collection is to find data objects in a system that cannot or need not be accessed in the future, and to reclaim the resources (i.e. storage space) used by those objects. Using one of several techniques, garbage collection module 246 can determine whether each data storage item is garbage (i.e., stale or not active) and can be deleted, or whether they are active and/or in-use and should be saved.

At block 540, method 500 writes the data storage items from the first logical storage segment to other logical storage segments based on corresponding data age clusters. For example, memory manager 140 may write a first active data storage item associated with a first group of the two data storage item groups from the first logical storage segment to a second logical storage segment, the second logic storage segment comprising other active data storage items associated with the first group. Similarly, memory manager 140 may write a stale data storage item associated with a second group of the two data storage item groups from the first logical storage segment to a third logical storage segment, the third logical storage segment comprising other data storage items associated with the second group.

At block 550, method 500 performs the garbage collection process on the additional logical storage segments. Since each of logical storage segments 310 and 320 include data storage items from a respective group or cluster, these data storage items are more likely to be overwritten and become garbage at the same or a similar time. As a result, garbage collection module 246 can perform the garbage collection process more efficiently on segments 310 and 320 in the future.

Figure 6:
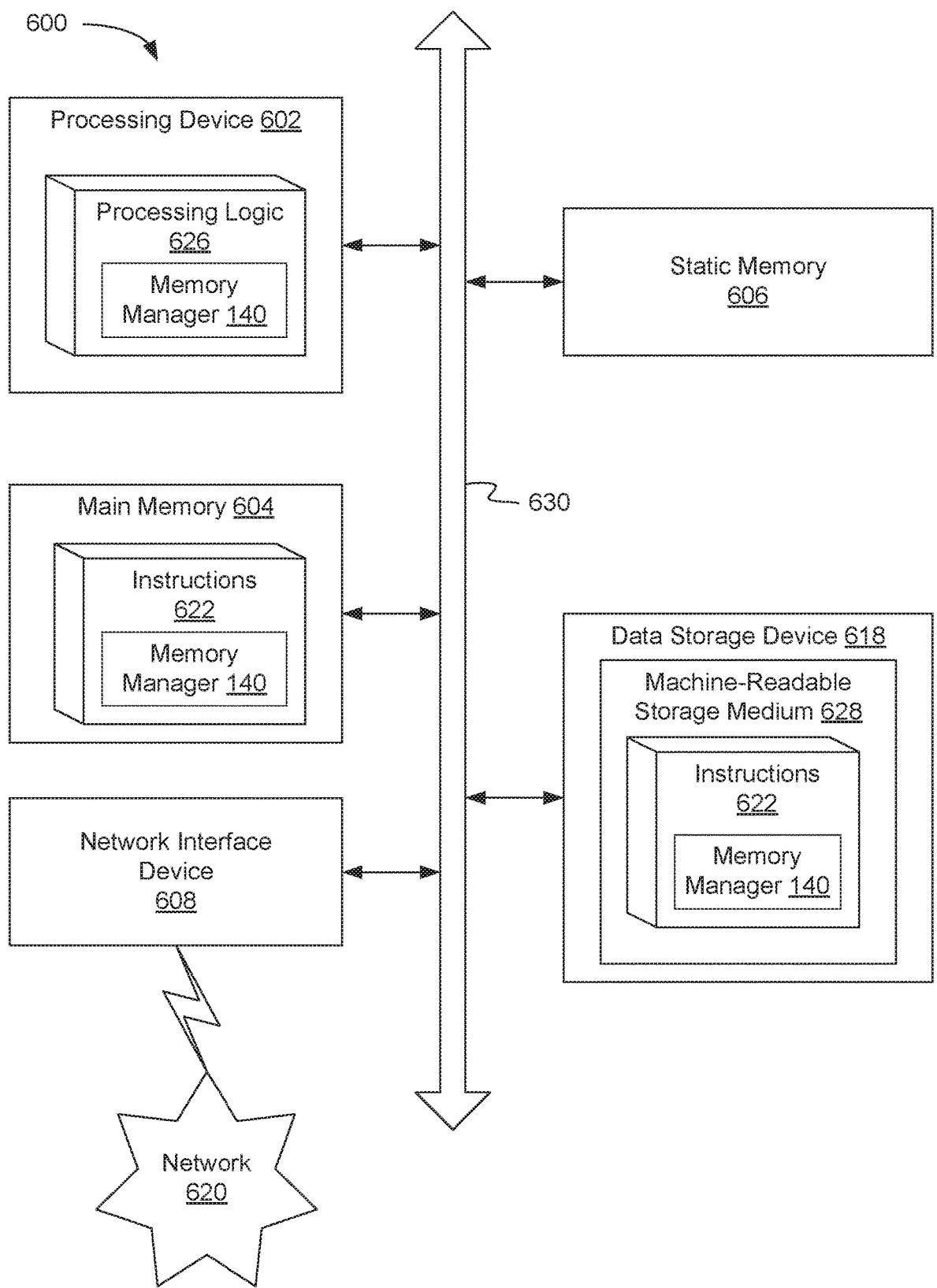
FIG. 6 is a block diagram illustrating an exemplary computer system on which embodiments of the present disclosure may be implemented.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may be representative of a server, such as storage controller 110 running memory manager 140 or of a client, such as initiator devices 115 or 125.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618, which communicate with each other via a bus 630. Data storage device 618 may be one example of any of the storage devices 135A-n in FIG. 1 or data store 250 in FIG. 2. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic 626, which may be one example of memory manager 140 shown in FIGS. 1 and 2, or of initiator application 112 or 122, for performing the operations and steps discussed herein.

The data storage device 618 may include a machine-readable storage medium 628, on which is stored one or more set of instructions 622 (e.g., software) embodying any one or more of the methodologies of functions described herein, including instructions to cause the processing device 602 to execute memory manager 140 or initiator application 112 or 122. The instructions 622 may also reside, completely or at least partially, within the main memory 604 and/or within the processing device 602 during execution thereof by the computer system 600; the main memory 604 and the processing device 602 also constituting machine-readable storage media. The instructions 622 may further be transmitted or received over a network 620 via the network interface device 608.

The machine-readable storage medium 628 may also be used to store instructions to perform a method for uniform sampling in an append only database to determine the temporal distribution of data, as described herein. While the machine-readable storage medium 628 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive or.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A system comprising:
  a storage array comprising a plurality of storage volumes; and
  a storage controller coupled to the storage array, the storage controller comprising a processing device, the processing device to:
    perform a uniform sampling of data storage items in an append-only file system distributed across the plurality of storage volumes to identify a sample set;
    identify a plurality of data age clusters from the sample set;
    perform a garbage collection process on the append-only file system to identify a first data storage item in a first logical storage segment that is no longer in use, a second data storage item in the first logical storage segment that remains in use, and a third data storage item in the first logical storage segment that remains in use;
    write the second data storage item from the first logical storage segment to a second logical storage segment based on a data age of the second data storage item, wherein the second logical storage segment is associated with a first data age cluster of the plurality of data age clusters; and
    write the third data storage item from the first logical storage segment to a third logical storage segment based on an age of the third data storage item, wherein the third logical storage segment is associated with a second data age cluster of the plurality of data age clusters.

2. The system of claim 1, wherein to perform the uniform sampling of the data storage items in the append-only file system, the processing device to apply a reservoir sampling algorithm.

3. The system of claim 1, wherein the sample set comprises a subset of the data storage items in the append-only file system, and wherein each of the data storage items in the append-only file system has an equal probability of appearing in the sample set.

4. The system of claim 1, wherein the sample set represents a data age distribution of the data storage items in the append-only file system.

5. The system of claim 1, wherein to identify the plurality of data age clusters from the sample set, the processing device to apply a distribution density function to the sample set.

6. The system of claim 1, wherein the processing device to write the second data storage item from the first logical storage segment to the second logical storage segment and write the third data storage item from the first logical storage segment to the third logical storage segment in parallel.

7. The system of claim 1, wherein the processing device further to:
  perform the garbage collection process on the second logical storage segment, wherein data storage items in the second logical storage segment have data ages that fall within the first data age cluster.

* * * * *